United States Patent
Wo (10) Patent No.: US 8,558,653 B2
(45) Date of Patent: Oct. 15, 2013

(54) ENAMELED ALUMINUM WIRE WINDING AND PREPARATION METHOD THEREOF

(75) Inventor: Kahong Wo, Dongguan (CN)

(73) Assignee: Dongguan Gouliang Motor Co., Limited, Dongguan, Guangdong (CN)

( * ) Notice: Subject to any disclaimer, the term of this patent is extended or adjusted under 35 U.S.C. 154(b) by 0 days.

(21) Appl. No.: 13/641,648

(22) PCT Filed: Apr. 19, 2011

(86) PCT No.: PCT/CN2011/072970
§ 371 (c)(1),
(2), (4) Date: Oct. 16, 2012

(87) PCT Pub. No.: WO2011/134362
PCT Pub. Date: Nov. 3, 2011

(65) Prior Publication Data
US 2013/0033352 A1    Feb. 7, 2013

(30) Foreign Application Priority Data
Apr. 27, 2010  (CN) .......................... 2010 1 0161894

(51) Int. Cl.
*H01F 27/29*  (2006.01)
*H01F 27/30*  (2006.01)

(52) U.S. Cl.
USPC ........................... 336/192; 336/198; 336/208

(58) Field of Classification Search
USPC ........... 336/198, 208, 192; 228/173.5; 335/78
See application file for complete search history.

(56) References Cited

U.S. PATENT DOCUMENTS

| | | | | |
|---|---|---|---|---|
| 5,008,644 | A * | 4/1991 | Cooper | 336/192 |
| 6,326,874 | B1 * | 12/2001 | Banzi et al. | 336/192 |
| 6,344,786 | B1 * | 2/2002 | Chin | 336/198 |
| 7,764,157 | B2 * | 7/2010 | Schulz et al. | 336/198 |

* cited by examiner

*Primary Examiner* — Alexander Talpalatski
*Assistant Examiner* — Mangtin Lian
(74) *Attorney, Agent, or Firm* — Shimokaji & Associates P.C.

(57) ABSTRACT

An enameled aluminum wire winding includes a framework, a connection terminal, an enameled aluminum wire, and a protective cover. The connection terminal includes a fixed part, one end of which extends to form a welded part, and the other end of which extends to form an external connection part. The fixed part is fixed to the framework. The enameled aluminum wire is wound on the framework. A contact portion of the enameled aluminum wire is welded with the welded part to form a connection section. The protective cover is provided with a glue groove in which insulating glue is contained. The connection section is submerged in the insulating glue and the insulating glue is solidified. The protective cover and the solidified insulating glue therein doubly protect the connection section, so the problems of easy oxidation, corrosion, and cracking in the connection section are solved. The winding is safe and stable.

8 Claims, 6 Drawing Sheets

ENAMELED ALUMINUM WIRE WINDING AND PREPARATION METHOD THEREOF

FIELD OF THE INVENTION

The present invention relates to an enameled aluminum wire winding and a preparation method thereof, and more particularly to a safe and timeproof enameled aluminum wire winding with stable structure and a preparation method thereof.

BACKGROUND OF THE INVENTION

As price of copper become higher and higher, thus the cooper is being replaced with aluminum gradually in electro-motor industry. However, aluminum wires have a lot of disadvantages such as weak flexibility, easy to be oxidized and hard to be welded compared with copper wires. Conventionally, when connecting the enameled aluminum wire with other wires or connection terminals, a lacquer coat thereof is removed by physical method or chemical method firstly, and then the connection between the enameled aluminum wire and other wires or connection terminals is carried out. Chinese patent application No. 200920018676.8 discloses an inductive element for enameled aluminum wire winding which includes a framework and an enameled aluminum wire. And the enameled aluminum wire winding is made by connecting a head portion of the enameled aluminum wire with a leg having solidification solder.

However, this method brings several problems. Firstly, as the lacquer coat at the connection part or welded part has been removed so that the aluminum wire is exposed in the external air and will be oxidized easily. Moreover, corrosion of the aluminum wire will become much severe under the impact of the external environment, which causes the aluminum wire becomes stiffen and brittle. When the electromotor is on operation, the connection part and neck portion of the aluminum wire are easy to be broken and cracked as the electromotor shakes, which may shorten the life of the enameled aluminum wire. Secondly, due to the corrosion of the aluminum wire at the connection part or welded part, the resistance of the aluminum wire at the connection part or welded part will become larger which causes the corresponding part generate heat and then aggravate the oxidation of the aluminum wire, furthermore causes a fire on the aluminum wire when it overheats. Thirdly, as shakes may be generated during the operation of equipments having the enameled aluminum wire winding such as electromotor, transformer, relay or solenoid, thus the connection part may be disengaged with the leg under the shakes.

Thus, there is a need for a safe and timeproof enameled aluminum wire winding with a stable structure and a preparation method thereof to overcome the drawbacks such as easy oxidization, cracking and the like.

SUMMARY OF THE INVENTION

One aspect of the present invention is to provide a safe and timeproof enameled aluminum wire winding with a stable structure.

Another aspect of the present invention is to provide a preparation method of an enameled aluminum wire which is safe and timeproof.

To achieve above objectives, an enameled aluminum wire winding includes a framework, at least one connection terminal, an enameled aluminum wire, and a protective cover. The at least one connection terminal includes a fixed, one end of which extends to form a welded part, and the other end of which extends to form an external connection part. The fixed part is fixed to the framework. The enameled aluminum wire is wound on the framework. A contact portion of the enameled aluminum wire is welded with the welded part of the connection terminal to form a connection section. The protective cover is provided with a glue groove in which insulating glue is contained. The connection section is submerged in the insulating glue and then the insulating glue is solidified.

As a preferred embodiment, at least one supporting step is provided on the framework, the fixed part is fixed on the supporting step, the welded part passes through the supporting step, and the protective cover is engaged with the supporting step. On one hand, the connection between the fixed part and the framework is firm since the fixed part is fixed on the supporting step; and the connection between the protective cover and the framework is firm as well since the protective cover is fixed on the supporting step. Thus the structure of the whole enameled aluminum wire winding is stable and timeproof. On the other hand, the protective cover is engaged with the support step, and both the fixed part and the welded part are accommodated within the protective cover and the supporting step, which can avoid connection portion between the connection terminal and the framework to be exposed outside, thereby the enameled aluminum wire winding is simple and compact.

Preferably, the supporting step has a supporting slot formed therein for engaging with the fixed part, the fixed part is inserted into the supporting slot, and the welded part passes through the supporting slot and is exposed outside the supporting step. This connection way between the fixed part and the supporting step is simple and quick, which causes the fixed part to be protected within the supporting slot and makes the connection more stable.

More preferably, the fixed part is trapezoidal, and several barbs are formed on a rim of the fixed part. The barbs are hooked on inner walls of the supporting slot after the fixed part is inserted into the supporting slot, which can prevent the connection terminals from being slid from the supporting slot.

Preferably, the at least one supporting step includes a first supporting step and a second supporting step arranged in parallel, a location piece is formed between the first supporting step and the second supporting step; the at least one glue groove includes a first glue groove cooperated with the first supporting step and a second glue groove cooperated with the second supporting step, and a location slot is formed between the first glue groove and the second glue groove and cooperated with the location piece. This cooperation between the locating piece and the location slot can efficiently prevent location offset between the protective cover and the supporting step.

Preferably, a wire slot is formed at one side of the supporting step adjacent to the framework. The contact portion of the enameled aluminum protrudes from the supporting slot and then is welded on the welded part. Since the enameled aluminum wire is guided to connect with the welded part by the wire slot, thus the enameled aluminum wire can be protected efficiently and the friction between the enameled aluminum wire and the protective cover can be avoided.

Preferably, at least one enhancing rib is formed at one side of the supporting step opposite to the protective cover, which enhances the supporting step.

More preferably, the insulating glue is made of epoxy resin, encapsulant, or polyurethane.

Accordingly, a preparation method of an enameled aluminum wire winding includes steps of:

(1) winding the enameled aluminum wire on the framework and fixing the fixed part of the connection terminal to the framework;

(2) welding the contact portion of the enameled aluminum wire with the welded part of the connection terminal to form a connection section;

(3) injecting the insulating glue into the glue groove of the protective cover; and (4) submerging the connection section in the insulating glue and solidifying the insulting glue.

Preferably, the insulating glue is made of epoxy resin, encapsulant, or polyurethane.

The enameled aluminum wire winding of the present invention includes a framework, connection terminals, an enameled aluminum wire, and a protective cover. The connection section formed by welding the contact portion of the enameled aluminum wire and the welded part is placed within the protective cover in which the insulating glue is contained, thus the connection section is double protected by the protective cover and the insulating glue solidification. In comparison with the prior art, on one hand, the connection section formed by welding the contact portion of the enameled aluminum wire and the welded part is enwrapped within the insulating glue solidification, which efficiently protects the contact portion of the enameled aluminum wire on which the lacquer coat is without, so that the problems such as the portion to be welded of the enameled aluminum wire is easy to be oxidized, cracked, generate heat, or be on fire can be avoided, thereby the using life and safety of the enameled aluminum wire winding could not be affected by external environment (such as temperature, humidity or corrosive gases). Therefore, the enameled aluminum wire winding is safe and has a long using life. On the other hand, when the connection section is submerged in the insulating glue, the contact portion, the neck portion (the portion connected the contact portion with the other parts of the enameled aluminum) of the enameled aluminum wire, and the welded part are under protection of the insulating glue and the protective cover. Therefore, there will no crack happened between the contact portion of the enameled aluminum wire and the welded part of the connection terminal, or between the contact portion and the neck portion of the enameled aluminum wire, even shakes are generated while electrical motor is on operation. By this token, the problems that the enameled aluminum wire will be cracked when the electrical motor shakes, or the contact portion will disengage from the welded portion of the prior art are solved. Therefore, the structure of the enameled aluminum wire winding is stable, reliable and timeproof. In conclusion, the enameled aluminum wire winding of the present invention has a long life and a stable structure, and is safe and reliable.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Various preferred embodiments of the invention will now be described with reference to the figures, wherein like reference numerals designate similar parts throughout the various views.

Figure 1:
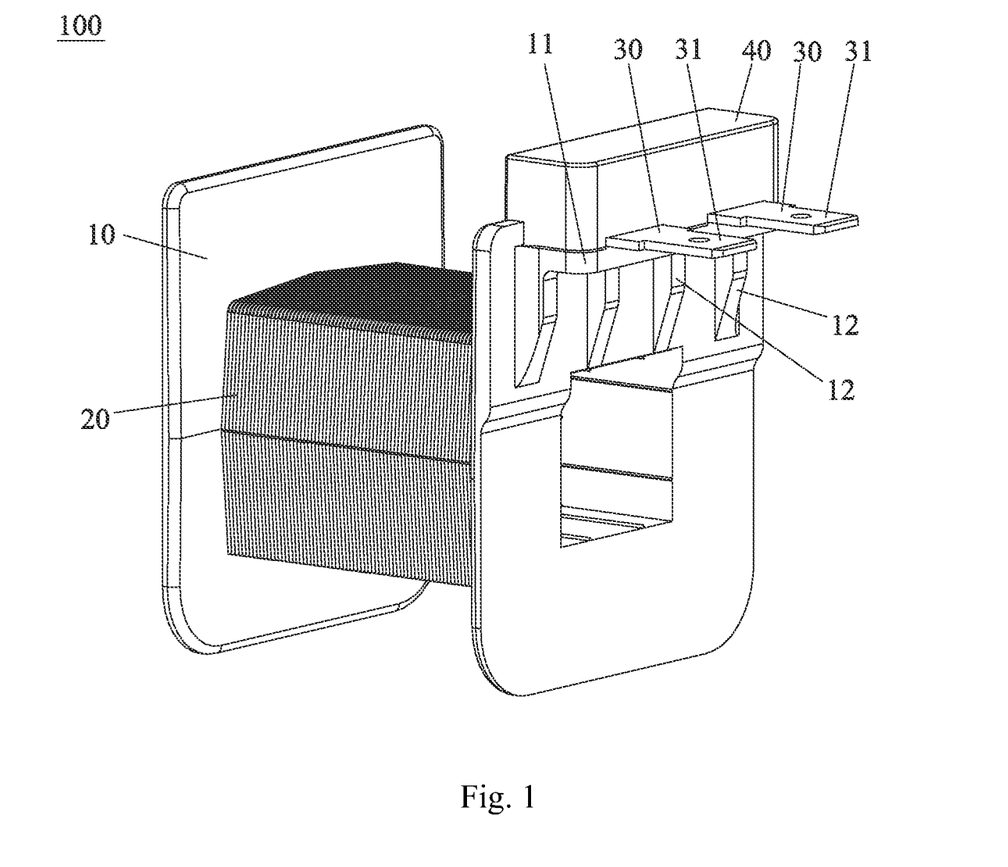
FIG. 1 is a perspective view of an enameled aluminum wire winding according to one embodiment of the present invention.
Figure 2:
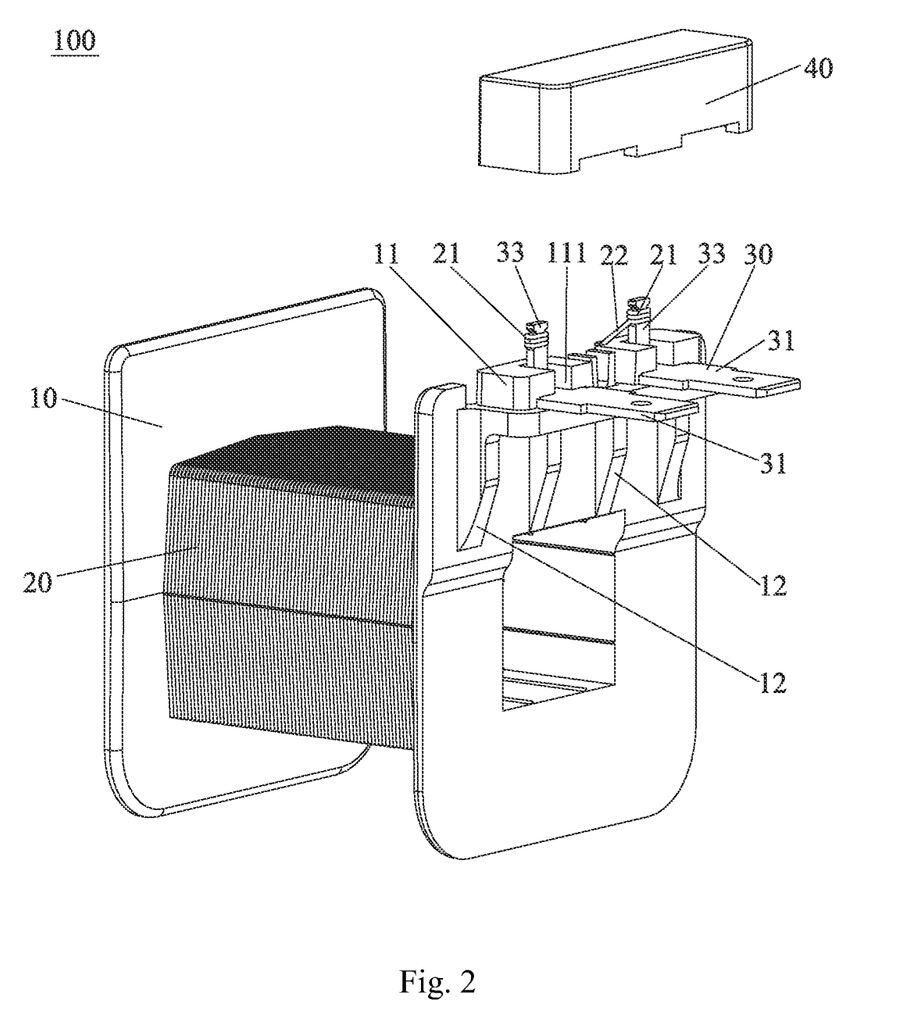
FIG. 2 is a perspective exploded view of the enameled aluminum wire winding.

Referring to FIGS. 1-2, the enameled aluminum wire winding 100 according to one embodiment of the present invention includes a framework 10, several connection terminals 30, an enameled aluminum wire 20, and a protective cover 40. Each connection terminal 30 includes an external connection part 31, a fixed part 32 connected with the external connection part 31, and a welded part 33 positioned on the fixed part 32. The fixed part 32 is fixed on the framework 10, and the enameled aluminum wire 20 is wound on the framework 10. A contact portion 21 of the enameled aluminum wire 20 is welded with the welded part 33 of the connection terminal 30 to form a connection section (not labeled). The protective cover 40 has at least one glue groove 41 in which insulating glue 50 is contained, and the connection section is submerged in the insulating glue 50 and then the insulating glue 50 is solidified.

Preferably, referring to FIG. 2, the framework 10 has at least one supporting step 11 formed thereon, and the fixed part 32 is fixed on the supporting step 11, the welded part 33 passes through the supporting step 11, and the protective cover 40 is engaged with the supporting step 11.

Figure 3:
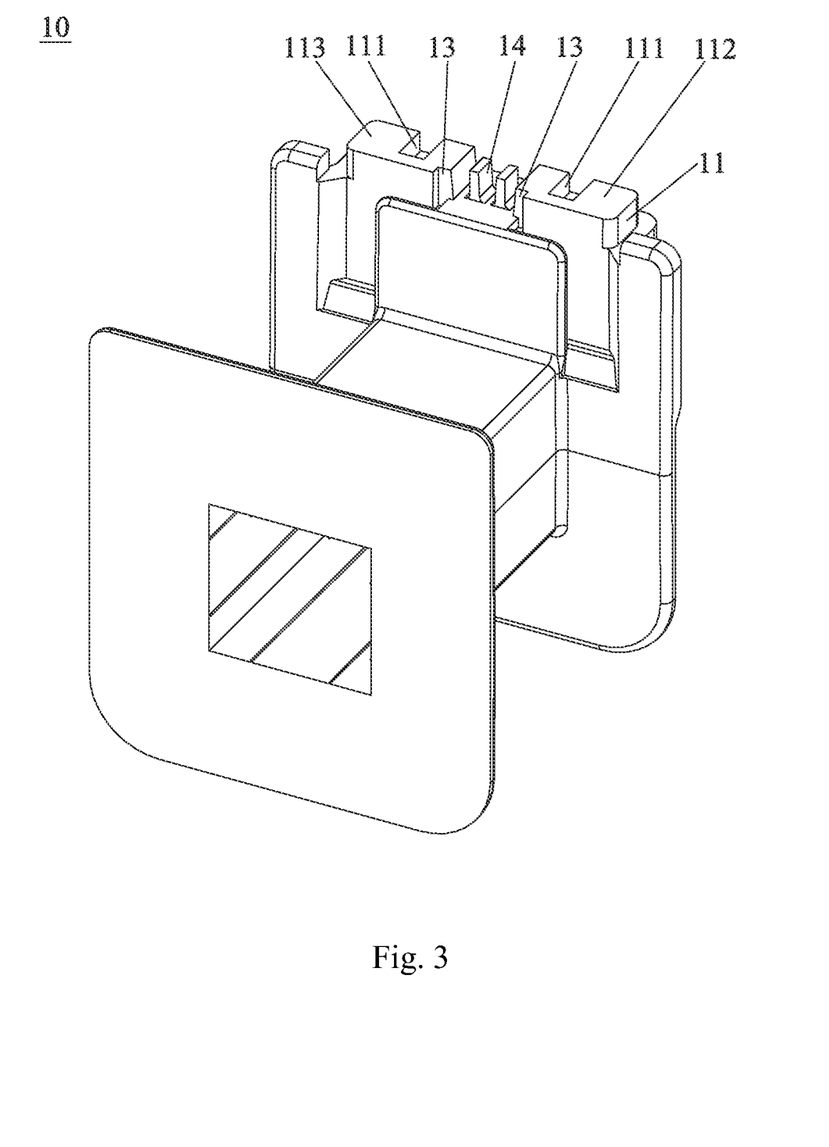
FIG. 3 is a perspective view of a framework of the enameled aluminum wire winding.
Figure 4:
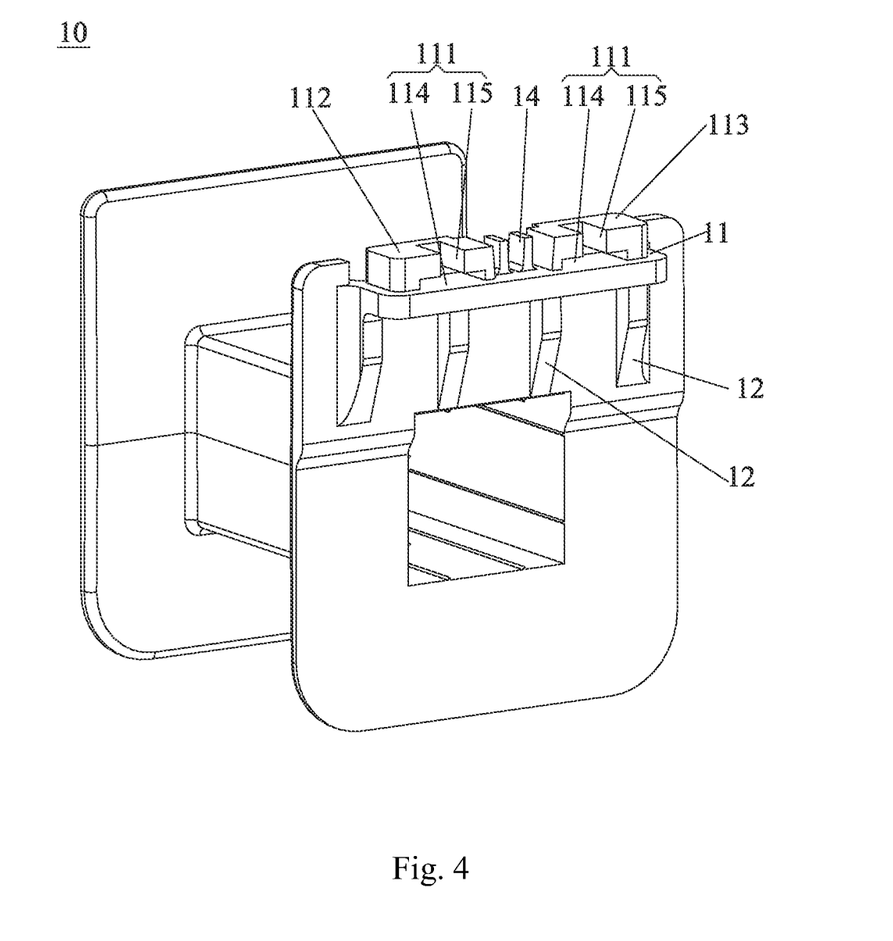
FIG. 4 is another perspective view of the framework.

Concretely, the supporting step 11 has a supporting slot 111 formed therein and adapted for engaging with the fixed part 32, and the welded part 33 passes through the supporting slot 111 and is exposed outside the supporting step 11. Specifically, referring to FIG. 5, the fixed part 32 is plate-shape, and the welded part 33 is perpendicular to the fixed part 32 and is strip-shape. Referring to FIGS. 3-4, the supporting slot 111 includes a first slot 114 cooperating with the fixed portion 32 and a second slot 115 formed above the first slot 114 and communicated with the first slot 114. Referring to the FIG. 2, the fixed part 32 is inserted into the first slot 114, and the welded part 33 passes through the second slot 115 and is exposed outside. In addition, please refer to FIG. 6, the protective cover 40 includes a protruded member 44 cooperated with the second slot 115 and an open 42 adapted for allowing the connection terminal 30 to pass through. After the protective cover 40 covering the supporting steps 11, the fixed parts 32 and the welded parts 33 of the connection terminals 30 are protected between the supporting steps 11 and the protective cover 40, and the external connection part 31 protrudes from the open 42 and is exposed outside the protective cover 40 and the supporting step 11. Furthermore, the fixed parts 32 of the connection terminals 30 can be embedded into the supporting slot 111. Optionally, other connection ways such as buckling or locking also can be chose.

Figure 5:
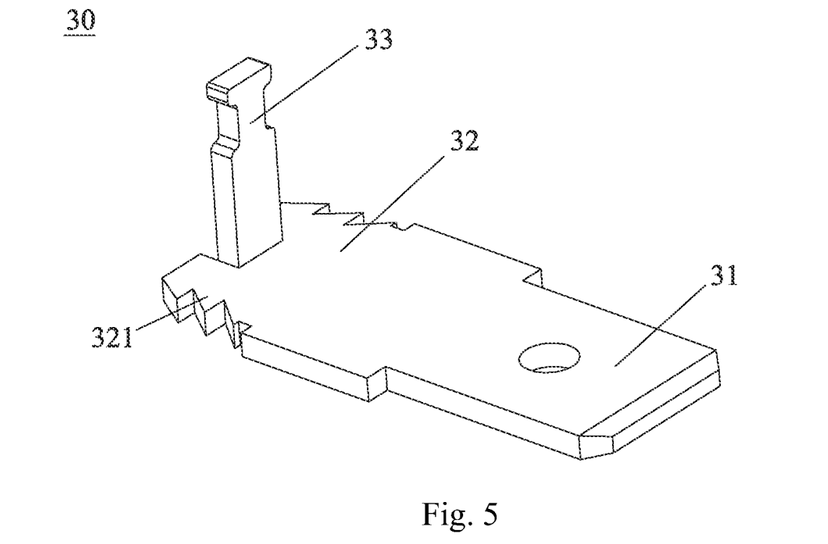
FIG. 5 is a perspective view of a connection terminal of the enameled aluminum wire winding.
Figure 6:
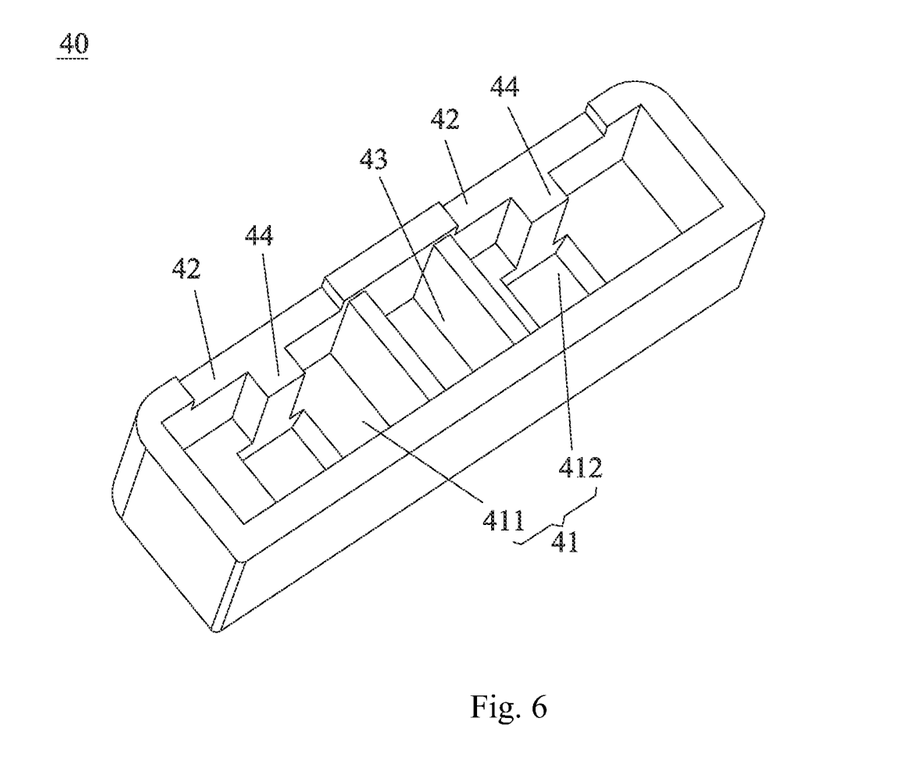
FIG. 6 is a perspective view of a protective cover of the enameled aluminum wire winding.

More specifically, the fixed part 32 is trapezoidal, and several barbs 321 are formed on a rim of the fixed part 32. When the fixed part 32 is inserted into the supporting slot 111, the barbs 321 hook in the inner walls of the supporting slot 111 so that the connection between the connection terminal 30 and the supporting slot 111 become more stable.

Referring to FIGS. 3-4, the at least one supporting step 11 includes a first supporting step 112 and a second supporting step 113 arranged in parallel, a location piece 14 is formed between the first supporting step 112 and the second supporting step 113. The at least one glue groove 41 includes a first glue groove 411 engaging with the first supporting step 112 and a second glue groove 412 engaging with the second supporting step 113. A location slot 43 is formed between the first glue groove 411 and the second glue groove 412 for engaging with the location piece 43. When the protective cover 40 covers on the supporting steps 11, their matching position will not be deflected due to the cooperation of the location piece 14 and the location slot 43.

Referring to FIG. 3, a wire slot 13 is formed at one side of the supporting step 11 adjacent to the framework 10, which is vertically formed at one side of the supporting step 11 adjacent to the framework 10 and runs through the bottom and top of the supporting step 11. Alternatively, the wire slot 13 can be configured outside or inside the supporting step 11, and the contact portion 21 of the enameled aluminum wire 20 extends upwards through the wire slot 13 until it can be wound on the welded part 33. Since the enameled aluminum wire 20 is guided to connect with the welded part 33 by the wire slot 13, thus the enameled aluminum wire 20 can be protected efficiently and the friction between the enameled aluminum wire 20 and the protective cover 40 can be avoided.

Referring to FIG. 4, several enhancing ribs 12 are formed at one side of the supporting step 11 opposite to the protective cover 40, by which the supporting step 11 become more stable. Of course, it also can configure thickening step or triangle bracket on the bottom of the supporting step 11, so as to increase the stability of the supporting step 11. And the enhancing ribs 12 of the present embodiment can efficiently improve the intensity of the supporting step 11 not only, and save material and reduce cost but also.

Preferably, the insulating glue is made of epoxy resin, encapsulant, or polyurethane.

Now a preparation method of the enameled aluminum wire winding 100 of the present invention will be described. Firstly, the framework 10, the enameled aluminum wire 20, connection terminals 30 and protective cover 40 are provided beforehand. And the preparation method of the enameled aluminum wire winding 10 includes:

Step (1), winding the enameled aluminum wire 20 with predetermined diameter and circles on the framework 10, and fixing the connection terminals 30 to the framework 10. Concretely, it includes step of connecting the fixed part 32 of each connection terminals 30 with the supporting step 11 firmly. More concretely, referring to FIG. 2, the fixed part 32 is inserted into the supporting slot 111 and then accommodated within the first slot 114 of the supporting slot 111. The welded part 33 runs through and then is exposed outside the second slot 115, and the external connection part 31 of the connection terminal 30 is exposed outside the supporting step 11. Specifically, several barbs 321 are formed on the fixed part 32 and then hooked in the inner walls of the first slot 114.

Step (2), peeling off the lacquer coat of the contact portion 21 of the enameled aluminum wire 20 by a special machine or chemical method, and then welding the contact portion with the welded part 33. Concretely, one end of the welded part 33 which is far away from the fixed part 32 is I-shaped, and the contact portion 21 is wound on the I-shaped end and welded with the welded part 33. After welded, a portion (namely the connection section) connecting with the contact portion and the welded part 33 immerges into the Sn condensate.

Step (3), injecting the insulating glue 50 into the glue grooves 41 of the protective cover 40. Concretely, it includes injecting the first glue groove 411 and the second glue groove 412. The insulating glue 50 can be epoxy resin, encapsulant, or polyurethane, or other colloid which can be solidified.

Figure 7:
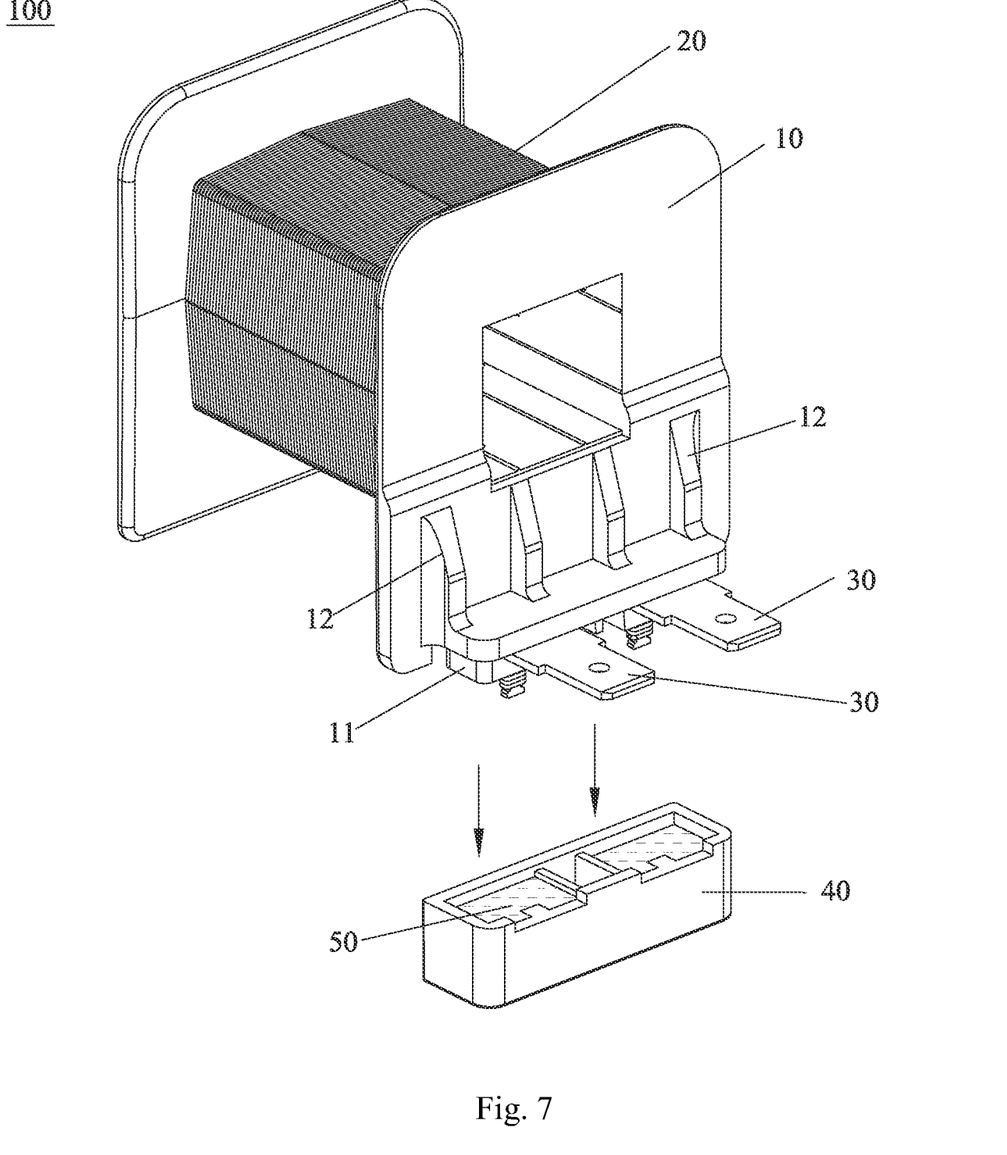
FIG. 7 is a perspective view of the enameled aluminum wire winding, which shows the cooperation status of the supporting step and the protective cover.

Step (4), submerging the connection section formed by welding the contact portion 21 and the welded part 33, and then forming semi-manufactured goods of an enameled aluminum wire winding. Referring to FIG. 7, the welded part 33 of the connection terminal 30 is inserted into the glue grooves 41 filled with the insulating glue 50, so that the supporting step 11 and the protective cover 40 are fitting well. Concretely, the first glue groove 411 is cooperated with the first supporting step 112, the second glue groove 412 is cooperated with the second supporting step 113, the location slot 43 is cooperated with the location piece 14, and the protruded member 44 is cooperated with the second slot 115, so that the protective cover 40 and the supporting steps 11 are engaging with each other thereby the fixed part 32 and the welded part 33 of each connection terminal 30 are accommodated therein. Specifically, the welded parts 33, the contact portion 21 and the neck portion 22 of the enameled aluminum wire are placed within the protective cover 40, and the external connection part 31 of each connection terminal 30 protrudes from the open 42 and is exposed outside the protective cover 40.

Step (5), solidifying the insulating glue 50 thereby the preparation process of the enameled aluminum wire winding 100 is accomplished. Specifically, place the semi-manufactured goods of an enameled aluminum wire winding 100 on a place on which the framework 10 can be fixed until the insulating glue 50 is solidified completely, so that the supporting step 11 and the protective cover 40 are connected together, and the welded part 33. The contact portion 20 and the neck portion 22 of the enameled aluminum wire 20 are submerged by the solidified insulating glue 50.

Additionally, the enameled aluminum wire winding 100 of the present invention not only can be used in electromotor, electrical machines, but also can be used in other equipments such as transformer, solenoid or relay. Meanwhile, the present invention is not limited to the enameled aluminum wire, but also applicable for enameled copper wire winding.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An enameled aluminum wire winding, comprising a framework, at least one connection terminal, and an enameled aluminum wire, the connection terminal comprising a fixed part one end of which extends to form a welded part, and the other end of which extends to form an external connection part, the fixed part of the connection terminal being fixed to the framework, the enameled aluminum wire being wound on the framework, a contact portion of the enameled aluminum wire being welded with the welded part of the connection terminal to form a connection section; the enameled aluminum wire winding being characterized in that further comprises a protective cover, the protective cover is provided with at least one glue groove in which insulating glue is contained, the connection section is submerged in the insulating glue and then the insulating glue is solidified thereby forming insulating glue solidification which enwraps the connection section and cements the protective cover together, wherein at least one supporting step is provided on the framework, the fixed part is fixed on the supporting step, the welded part passes through the supporting step, and the protective cover is engaged with the supporting step, and wherein a wire slot is formed at one side of the supporting step adjacent to the framework.

2. The enameled aluminum wire winding according to claim 1, wherein the supporting step has a supporting slot formed therein for engaging with the fixed part, the fixed part is inserted into the supporting slot, and the welded part passes through the supporting slot and is exposed outside the supporting step.

3. The enameled aluminum wire winding according to claim 2, wherein the fixed part is trapezoidal, and several barbs are formed on a rim of the fixed part.

4. The enameled aluminum wire winding according to claim 1, wherein the at least one supporting step comprises a first supporting step and a second supporting step arranged in parallel, a location piece is formed between the first supporting step and the second supporting step; the at least one glue groove comprises a first glue groove cooperated with the first supporting step and a second glue groove cooperated with the second supporting step, and a location slot is formed between the first glue groove and the second glue groove and cooperated with the location piece.

5. The enameled aluminum wire winding according to claim 1, wherein at least one enhancing rib is formed at one side of the supporting step opposite to the protective cover.

6. The enameled aluminum wire winding according to claim 1, wherein the insulating glue is made of epoxy resin, encapsulant, or polyurethane.

7. A preparation method of an enameled aluminum wire winding as claimed in claim 1, comprising steps of:
(1) winding the enameled aluminum wire on the framework and fixing the fixed part of the connection terminal to the framework;
(2) welding the contact portion of the enameled aluminum wire with the welded part of the connection terminal to form a connection section;
(3) injecting the insulating glue into the glue groove of the protective cover; and
(4) submerging the connection section in the insulating glue and solidifying the insulting glue thereby forming insulating glue solidification for enwrapping the connection section.

8. The preparation method according to claim 7, wherein the insulating glue is made of epoxy resin, encapsulant, or polyurethane.

* * * * *

UNITED STATES PATENT AND TRADEMARK OFFICE
CERTIFICATE OF CORRECTION

| | | |
|---|---|---|
| PATENT NO. | : 8,558,653 B2 | Page 1 of 1 |
| APPLICATION NO. | : 13/641648 | |
| DATED | : October 15, 2013 | |
| INVENTOR(S) | : Kahong Wo | |

It is certified that error appears in the above-identified patent and that said Letters Patent is hereby corrected as shown below:

On the title page item (73) ASSIGNEE'S INFORMATION SHOULD READ     Dongguan Guoliang Motor Co., Limited,
    Dongguan, Guangdong (CN)

Signed and Sealed this
Twenty-eighth Day of January, 2014

Michelle K. Lee
*Deputy Director of the United States Patent and Trademark Office*